(12) United States Patent
Hsu

(10) Patent No.: US 8,959,719 B2
(45) Date of Patent: Feb. 24, 2015

(54) DUAL-SHAFT SYNCHRONOUS MOVEMENT DEVICE

(71) Applicant: First Dome Corporation, New Taipei (TW)

(72) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

(21) Appl. No.: 13/923,529

(22) Filed: Jun. 21, 2013

(65) Prior Publication Data
US 2014/0373654 A1 Dec. 25, 2014

(51) Int. Cl.
  *E05D 7/00* (2006.01)
  *E05D 11/08* (2006.01)
  *F16H 19/08* (2006.01)
  *F16H 21/44* (2006.01)

(52) U.S. Cl.
  CPC ...................................... *F16H 21/44* (2013.01)
  USPC ................... 16/366; 16/303; 16/330; 16/342

(58) Field of Classification Search
  CPC .............. E05D 3/06; E05D 3/12; E05D 3/16; E05Y 2900/60; G06F 1/1681; H04M 1/022; H04M 1/0225; H04M 1/0218; H04M 1/0216
  USPC ........... 16/354, 366, 365, 368, 369, 370, 342, 16/227, 226, 225; 361/679.08, 679.11, 361/679.02, 679.15, 679.27; 455/90.3, 455/575.1, 575.3, 575.8; 379/433.12, 379/433.13; 348/373, 333.01, 333.06, 794
  See application file for complete search history.

(56) References Cited

U.S. PATENT DOCUMENTS

| | | | | |
|---|---|---|---|---|
| 3,163,883 A * | 1/1965 | Olsson | ............................ | 16/354 |
| 3,386,128 A * | 6/1968 | Vyvyan | ............................ | 16/225 |
| 3,670,358 A * | 6/1972 | Schwartz et al. | ............... | 16/225 |
| 4,479,623 A * | 10/1984 | Maraghe et al. | ........... | 244/129.5 |
| 5,541,813 A * | 7/1996 | Satoh et al. | .................... | 361/752 |
| 6,334,235 B2 * | 1/2002 | Duperray et al. | ............... | 16/225 |
| 6,393,765 B1 * | 5/2002 | Goldstein et al. | ........... | 49/475.1 |
| 7,536,748 B2 * | 5/2009 | Renke et al. | ..................... | 16/289 |
| 2005/0050686 A1 * | 3/2005 | Kurokawa | ........................ | 16/354 |
| 2005/0122671 A1 * | 6/2005 | Homer | ........................... | 361/681 |

(Continued)

FOREIGN PATENT DOCUMENTS

| | | |
|---|---|---|
| EP | 1983201 A1 * | 10/2008 |
| JP | 2006064000 A * | 3/2006 |
| JP | 2008141712 A * | 6/2008 |

*Primary Examiner* — Chuck Mah
(74) *Attorney, Agent, or Firm* — Rosenberg, Klein & Lee

(57) ABSTRACT

A dual-shaft synchronous movement device includes a first shaft and a second shaft, which are synchronously rotatable. The synchronous movement device further includes a first rotor and/or a third rotor disposed on the first shaft and a second rotor and/or a fourth rotor disposed on the second shaft, and an inextensible/non-contractible flexible plate connected between the first (or the third rotor) and the second rotor (or the fourth rotor). When the first shaft drives the first rotor (or the third rotor) to rotate, the inextensible/non-contractible flexible plate pulls the second rotor (or the fourth rotor) to rotate in a direction reverse to a moving direction of the first rotor so as to make the first and second shafts synchronously rotate. The synchronous movement device solves the problem of delay of kinetic energy transmission and the problem of slippage, deflection and untrue operation of the conventional device.

24 Claims, 5 Drawing Sheets

(56) References Cited

U.S. PATENT DOCUMENTS

| | | | |
|---|---|---|---|
| 2008/0109995 A1* | 5/2008 | Kuwajima et al. | 16/354 |
| 2008/0216288 A1* | 9/2008 | Hoffman | 16/354 |
| 2009/0000062 A1* | 1/2009 | Yamanami | 16/366 |
| 2009/0282650 A1* | 11/2009 | Jin et al. | 16/367 |
| 2010/0024169 A1* | 2/2010 | Self | 16/354 |
| 2010/0071159 A1* | 3/2010 | Myung | 16/303 |
| 2011/0000136 A1* | 1/2011 | Brun | 49/358 |
| 2011/0157780 A1* | 6/2011 | Wang et al. | 361/679.01 |
| 2011/0205695 A1* | 8/2011 | Hassemer et al. | 361/679.01 |
| 2011/0289728 A1* | 12/2011 | Wang et al. | 16/337 |
| 2012/0047685 A1* | 3/2012 | Ma et al. | 16/319 |
| 2013/0135809 A1* | 5/2013 | Uchiyama et al. | 361/679.09 |

* cited by examiner

DUAL-SHAFT SYNCHRONOUS MOVEMENT DEVICE

BACKGROUND OF THE INVENTION

1. Field of the Invention

The present invention relates to an improved dual-shaft synchronous movement device. The dual-shaft synchronous movement device includes a first shaft and a second shaft and an assembly of rotors and cooperative inextensible/non-contractible flexible plates wound on the rotors. In operation, the first and second shafts are synchronously rotated to overcome the problem of the conventional transmission mechanism that the wires are likely to slip or deflect from the rollers.

2. Description of the Related Art

There are various electronic apparatuses provided with covers or display screens or viewers, such as mobile phones, notebooks, PDA, digital imagers and electronic books. The covers or display screens or viewers are pivotally mounted on the electronic apparatuses via pivot pins or rotary shafts, whereby the covers or display screens or viewers can be freely rotated and opened/closed under external force.

In order to operate the display module (such as the screen) and/or the apparatus body module of the electronic apparatus in more operation modes and application ranges, a dual-shaft mechanism is provided between the display module and the apparatus body module, whereby the display module and/or the apparatus body module can be operated in different operation modes by different rotational angles.

There is also a conventional mechanism composed of rollers and drive wires for transmitting force to the rotary shaft so as to rotate the rotary shaft. As known by those who are skilled in this field, during the operation process of the wires or the transmission belts, delay of kinetic energy transmission will take place. This is because the wires contact the rollers by points or lines or there is a gap between the wires and the rollers so that the wires are likely to slip or up and down deflect from the rollers. Under such circumstance, the wires will untruly operate to cause error. Also, the wires are made of elastic material and the fixing structure for assembling the wires with the rollers is not ideal. As a result, in force transmission, the load on the wires or the pulling force applied to the wires will increase. In this case, the transmission effect of the wires will be deteriorated and the wires may detach from the rollers. Especially, after a period of use, the force of the wires, which is preset in the assembling process will decrease due to elastic failure. Under such circumstance, the synchronous movement effect of the transmission mechanism will be deteriorated.

There is another problem existing in the application and manufacturing of the wires. That is, during the assembling process of the wires, the wires need to be tensioned. This will make it more difficult to control the quality of wiring and assembling. Therefore, the ratio of good products can be hardly promoted and the assembling time can be hardly shortened. As a result, the manufacturing cost is increased.

In order to improve the above problems, a conventional dual-shaft synchronous movement device has been developed. Such dual-shaft synchronous movement device employs multiple gears for transmitting force. However, as known by those who are skilled in this field, with the transmission gears, the gap between the shafts of the dual-shaft synchronous movement device can be hardly minified. Therefore, the entire transmission unit or structure will occupy a considerably large space. Especially, when the transmission unit is applied to a notebook or a miniaturized electronic device, the electronic device can hardly meet the requirement for lightweight and slimmed design. This is not what we expect.

The conventional rotary shaft structures and the relevant connection components thereof have some shortcomings in use and structural design that need to be overcome. It is therefore tried by the applicant to provide a dual-shaft synchronous movement device to eliminate the shortcomings existing in the conventional rotary shaft structure so as to widen the application range and facilitate the assembling process of the rotary shaft structures.

The dual-shaft synchronous movement device of the present invention has the following advantages:

1. The synchronous movement device of the present invention is mounted between the display module and the apparatus body module. When an operator 0°~180° rotates the display module, the apparatus body module is synchronously relatively 0°~180° rotated. Therefore, the total rotational angle of the display module and the apparatus body module is 360°. Accordingly, the operator can more quickly and conveniently operate the electronic apparatus in more operation modes (or application ranges). Also, the synchronous movement effect and operational stability of the synchronous movement device and the cooperative rotary shafts are enhanced.

2. The synchronous movement device of the present invention overcomes the problem of delay of kinetic energy transmission of the conventional wires. The synchronous movement device of the present invention also solves the problem of the conventional transmission mechanism that the wires contact the rollers by points or lines so that the wires are likely to slip or up and down deflect from the rollers and the wires will untruly operate to cause error. The synchronous movement device of the present invention also solves the problem of the conventional transmission mechanism that the fixing structure for assembling the wires with the rollers is not ideal so that in force transmission, the load on the wires or the pulling force applied to the wires will increase to deteriorate the transmission effect and the wires may detach from the rollers.

3. The synchronous movement device or transmission mechanism of the present invention is free from any gear for transmitting force as in the conventional technique. Therefore, the gap between the shafts can be as minified as possible. Therefore, the space occupied by the entire transmission unit or structure is reduced. Accordingly, when the transmission unit is applied to an electronic device, the electronic device can meet the requirement for lightweight and slimmed design.

SUMMARY OF THE INVENTION

It is therefore a primary object of the present invention to provide a dual-shaft synchronous movement device includes a first shaft and a second shaft, which are synchronously rotatable. The synchronous movement device further includes a first rotor and/or a third rotor disposed on the first shaft and a second rotor and/or a fourth rotor disposed on the second shaft, and an inextensible/non-contractible flexible plate connected between the first (or the third rotor) and the second rotor (or the fourth rotor). When the first shaft drives the first rotor (or the third rotor) to rotate, the inextensible/non-contractible flexible plate pulls the second rotor (or the fourth rotor) to rotate in a direction reverse to a moving direction of the first rotor so as to make the first and second shafts synchronously rotate. The synchronous movement device solves the problem of delay of kinetic energy transmission and the problem of slippage, deflection and untrue operation of the conventional device.

In the above dual-shaft synchronous movement, each of the first rotor (and/or the third rotor) and the second rotor (and/or the fourth rotor) has a support and a main body enclosing the support. The inextensible/non-contractible flexible plate has a first end and a second end. The first end of the inextensible/non-contractible flexible plate is fixed with the support of the first rotor (or the third rotor) and wound on the main body of the first rotor (or the third rotor). The second end of the inextensible/non-contractible flexible plate is fixed with the support of the second rotor (or the fourth rotor) and wound on the main body of the second rotor (or the fourth rotor). The first and second rotors (or the third and fourth rotors) contact the cooperative inextensible/non-contractible flexible plates by faces to transmit force. Accordingly, the torque change and deflection of the inextensible/non-contractible flexible plates are minimized and the first and second shafts can be smoothly rotated. Moreover, once the rotational force disappears, the shafts stop rotating to be located in a desired position.

In the above dual-shaft synchronous movement, the support has a shaft hole. The first shaft is fitted in the shaft holes of the first and third rotors and the second shaft is fitted in the shaft holes of the second and fourth rotors. An extension section extends from a middle section of the support for fixing the first and second ends of the inextensible/non-contractible flexible plate. The inextensible/non-contractible flexible plate has such a length that after the first rotor is 180° rotated along with the first shaft (or the second rotor is 180° rotated along with the second shaft), the first end (or the second end) of the inextensible/non-contractible flexible plate is still wound on the first rotor (or the second rotor) by a length larger than ½ circumferential length of the main body of the first rotor (or the main body of the second rotor).

The present invention can be best understood through the following description and accompanying drawings, wherein:

DETAILED DESCRIPTION OF THE PREFERRED EMBODIMENTS

Figure 1:
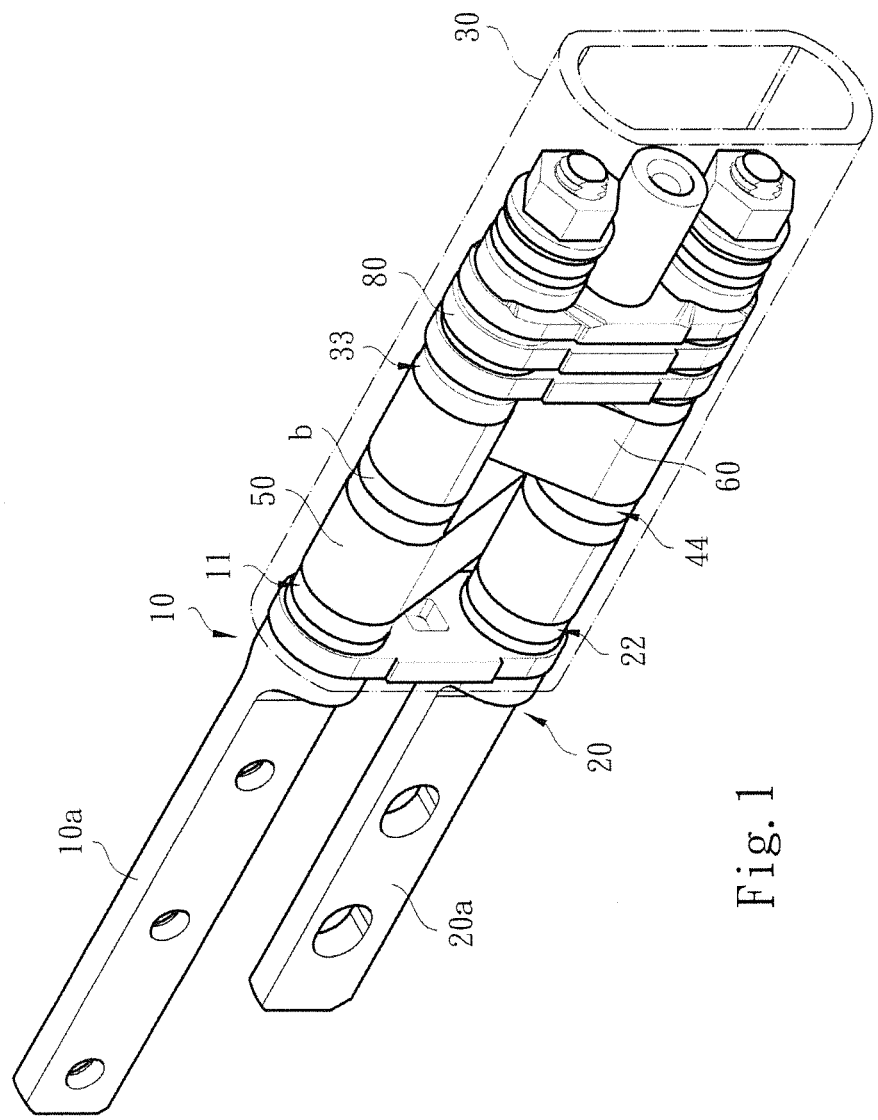
FIG. 1 is a perspective view of the synchronous movement device of the present invention, showing that the first and second shafts and the first to fourth rotors and the inextensible/non-contractible flexible plates are assembled with each other.
Figure 2:
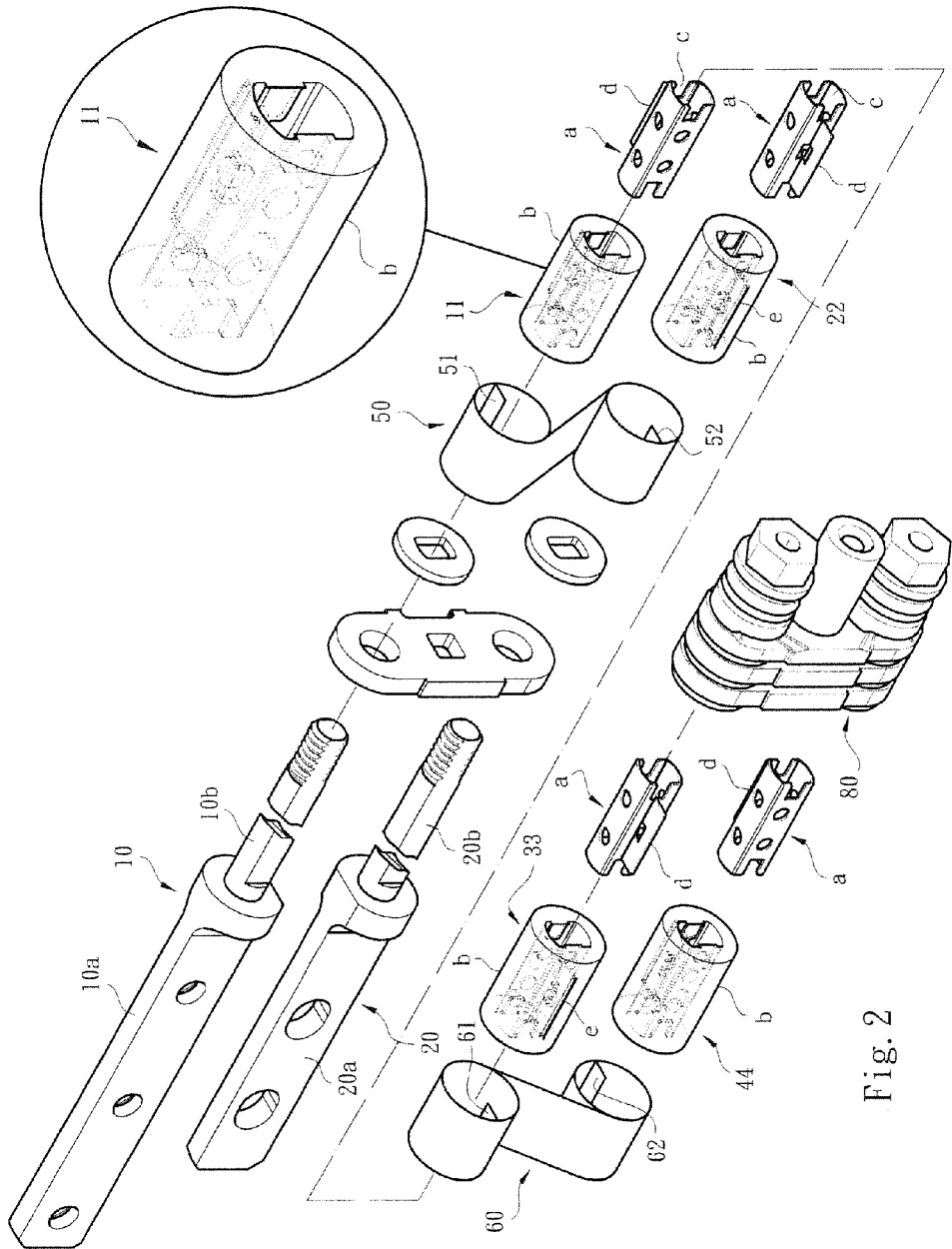
FIG. 2 is a perspective exploded view of the synchronous movement device of the present invention.
Figure 3:
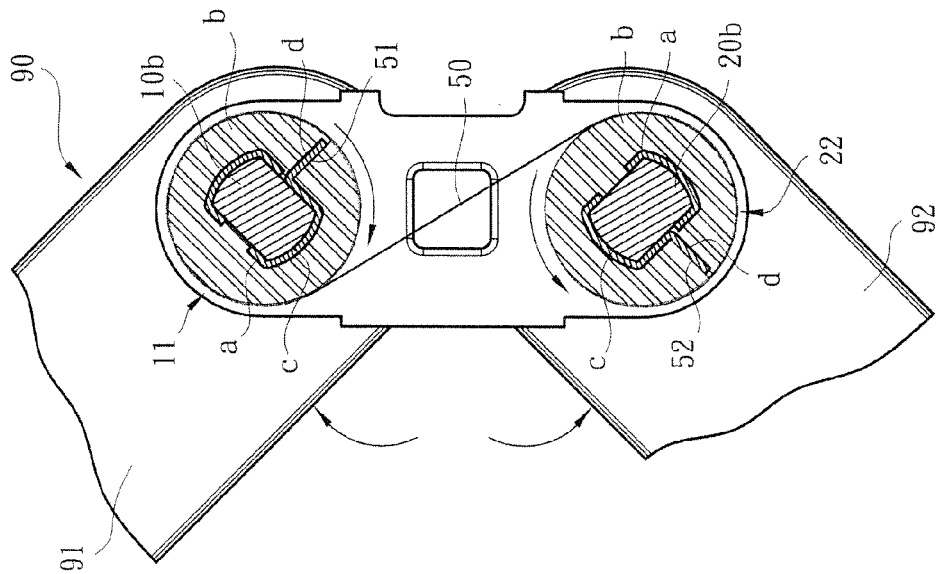
FIG. 3 is a sectional view showing that the synchronous movement device of the present invention is assembled with the display module and the apparatus body module, in which the display module is closed on the apparatus body module with the angle contained therebetween 0°.

Please refer to FIGS. 1, 2 and 3. The dual-shaft synchronous movement device of the present invention includes a first shaft 10 and a second shaft 20. The first and second shafts 10, 20 are assembled with each other and disposed in a casing 30. Each of the first and second shafts 10, 20 has a fixed end 10a, 20a and a pivoted end 10b, 20b. Through fixing seats (not shown), the fixed ends 10a, 20a of the first and second shafts 10, 20 are respectively fixed on a display module 91 and an apparatus body module 92 of an electronic apparatus 90 (such as a mobile phone or a computer).

Referring to FIGS. 1 and 2, the pivoted end 10b of the first shaft 10 is provided with a first rotor 11 (and/or a third rotor 33) and the pivoted end 20b of the second shaft 20 is provided with a second rotor 22 (and/or a fourth rotor 44). Inextensible/non-contractible flexible plates 50 (and/or 60) are disposed between the first and second rotors 11, 22 (and/or the third and fourth rotors 33, 44). The first and second rotors 11, 22 (and/or the third and fourth rotors 33, 44) and the inextensible/non-contractible flexible plates 50 (and/or 60) are assembled on the first and second shafts 10, 20 via a fixing assembly 80.

In this embodiment, each of the first, second, third and fourth rotors 11, 22, 33, 44 has a support a and a main body b enclosing the support a. The support a has a shaft hole c. The shaft hole c has a configuration identical to the cross-sectional shape of the pivoted ends 10b, 20b of the first and second shafts. For example, as shown in the drawings, the pivoted ends 10b, 20b of the first and second shafts (or the shaft holes c) have a rectangular cross section and the pivoted ends 10b, 20b of the first and second shafts 10, 20 are connected in the shaft holes c, whereby the first and third rotors 11, 33 are rotatable along with the first shaft 10 and the second and fourth rotors 22, 44 are rotatable along with the second shaft 20.

Please refer to FIGS. 2 and 3. The inextensible/non-contractible flexible plate 50 is disposed between the first and second rotors 11, 22. The inextensible/non-contractible flexible plate 60 is disposed between the third and fourth rotors 33, 44. To speak more specifically, the inextensible/non-contractible flexible plates 50, 60 are (flexible) metal plates or steel plates. Each of the inextensible/non-contractible flexible plates 50, 60 has a first end 51, 61 and a second end 52, 62. The first end 51 of the inextensible/non-contractible flexible plate 50 is fixedly wound on the main body b of the first rotor 11. The second end 52 of the inextensible/non-contractible flexible plate 50 is fixedly wound on the main body b of the second rotor 22. The first end 61 of the inextensible/non-contractible flexible plate 60 is fixedly wound on the main body b of the third rotor 33. The second end 62 of the inextensible/non-contractible flexible plate 60 is fixedly wound on the main body b of the fourth rotor 44.

Figure 2A:
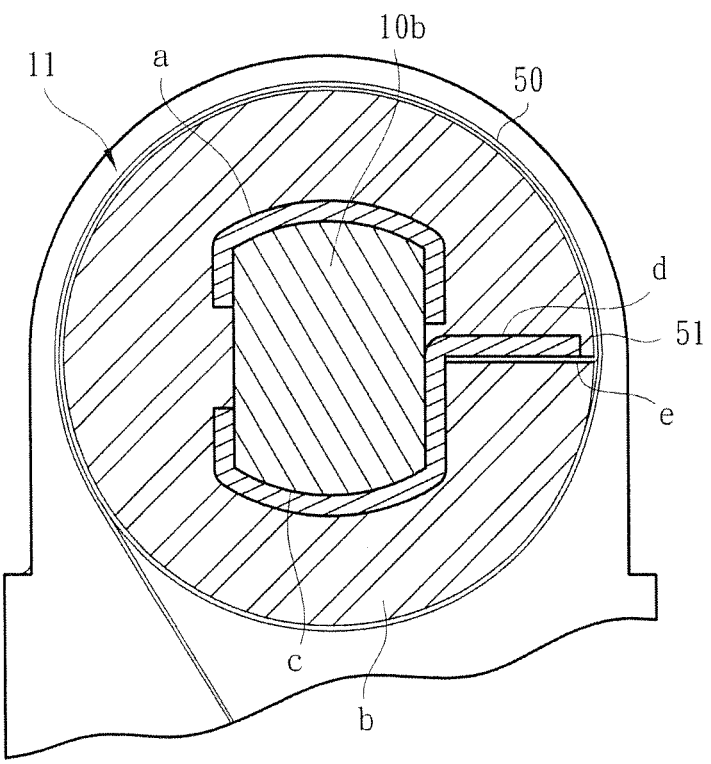
FIG. 2A is an enlarged sectional view of a part of the synchronous movement device of the present invention, showing that the first end of the inextensible/non-contractible flexible plate is welded with the extension section of the support of the first rotor and extends out of the main body of the first rotor through the slit of the main body.

Please refer to FIGS. 2 and 2A. An extension section d extends from a middle section of each support a for fixing the first ends 51, 61 and second ends 52, 62 of the inextensible/ non-contractible flexible plates 50, 60. To speak more specifically, the first ends 51, 61 of the inextensible/non-contractible flexible plates 50, 60 are fixedly welded on the extension sections d of the supports of the first and third rotors 11, 33. The inextensible/non-contractible flexible plates 50, 60 extend out of the main bodies b through slits e formed on the main bodies b to be wound around the main bodies b of the first and third rotors 11, 33. The second ends 52, 62 of the inextensible/non-contractible flexible plates 50, 60 are fixedly welded on the extension sections d of the supports of the second and fourth rotors 22, 44. The inextensible/non-contractible flexible plates 50, 60 extend out of the main bodies b through slits e formed on the main bodies b to be wound around the main bodies b of the second and fourth rotors 22, 44.

It should be noted that as shown in FIG. 2A, after the first and second ends 51, 61, 52, 62 of the inextensible/non-contractible flexible plates 50, 60 are fixedly welded on the extension sections d of the supports a and extended out of the main bodies b through the slits e, the direction in which the inextensible/non-contractible flexible plates 50, 60 are wound on the main bodies b is not limited. This facilitates the assembling process.

According to the above arrangement, the first and second rotors 11, (or the third and fourth rotors 33, 44) contact the inextensible/non-contractible flexible plates 50, 60 by faces to transmit torque. In this case, the torque change and up and down deflection of the inextensible/non-contractible flexible plates 50, 60 are minimized and the first and second rotors 10, 20 can be smoothly rotated. Moreover, once the rotational force disappears, the shafts stop rotating to be located in a desired position.

Please refer to FIGS. 2 and 3. The inextensible/non-contractible flexible plate 50 is wound on the first and second rotors 11, 22 in a direction reverse to the direction in which the inextensible/non-contractible flexible plate 60 is wound on the third and fourth rotors 33, 44. For example, FIG. 3 shows that the inextensible/non-contractible flexible plate 50 is wound from the left side of the first rotor 11 (according to the drawing) to the right side of the second rotor 22 in a direction reverse to the direction in which the inextensible/non-contractible flexible plate 60 is wound from the right side of the third rotor 33 to the left side of the fourth rotor 44. According to the above arrangement, the first and second shafts 10, 20 will rotate in different directions.

Figure 4:
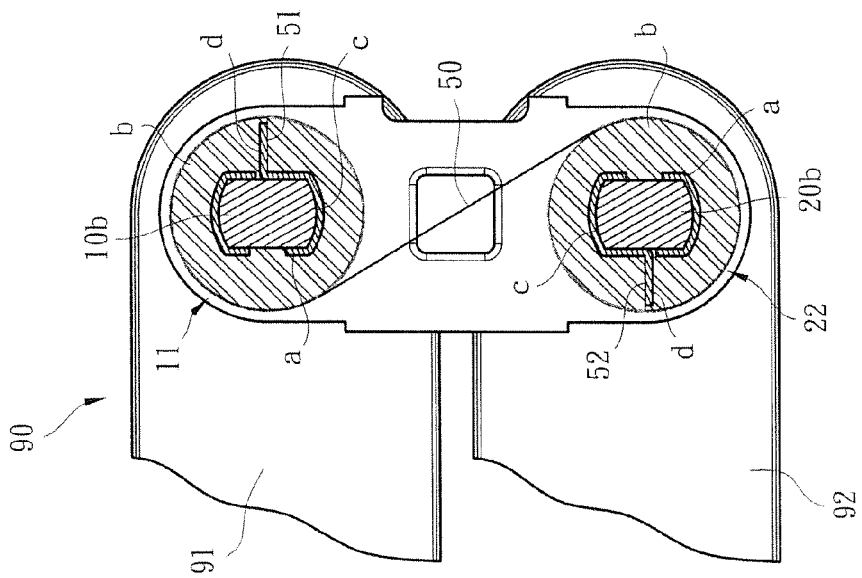
FIG. 4 is a sectional view showing the operation of the synchronous movement device of the present invention, in which the first and second rotors cooperative with the inextensible/non-contractible flexible plate to rotate the display module and the apparatus body module to a about 45° position.

Please refer to FIGS. 3 and 4, which show that the display module is closed onto the apparatus body module 92 with the angle contained therebetween 0°. When an operator opens the display module 91 to make the first shaft 10 drive the first rotor 11 (or the third rotor 33) to clockwise rotate according to the drawing, the inextensible/non-contractible flexible plate 50 drives the second rotor 22 to forcedly make the second shaft 20 rotate in a direction reverse to the moving direction of the first rotor 11, (that is, counterclockwise rotate). When the second shaft 20 is driven by the first shaft 10 to counterclockwise rotate, the fourth rotor 44 is simultaneously forcedly counterclockwise rotated, whereby the inextensible/non-contractible flexible plate 60 drives the third rotor 33 to (clockwise) rotate. Accordingly, the first and second shafts 10, 20 are synchronously rotated. Also, when the first shaft 10 is counterclockwise rotated, via the inextensible/non-contractible flexible plate 60, the third rotor 33 drives the fourth rotor 44 to make the second shaft 20 clockwise rotate. Accordingly, the first and second shafts 10, 20 are synchronously rotated.

Figure 6:
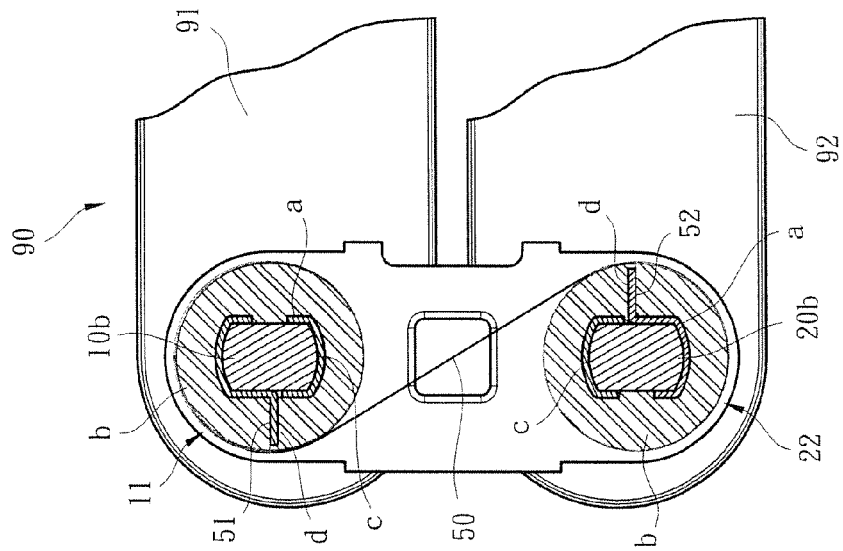
FIG. 6 is still another sectional view showing the operation of the synchronous movement device of the present invention, in which the first and second rotors cooperative with the inextensible/non-contractible flexible plate to rotate the display module and the apparatus body module to a about 180° position.
Figure 5:
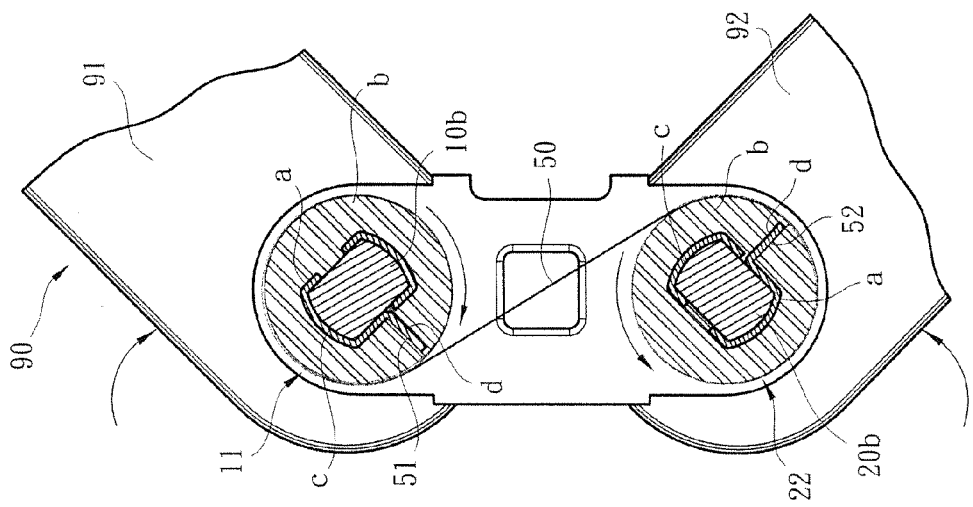
FIG. 5 is another sectional view showing the operation of the synchronous movement device of the present invention, in which the first and second rotors cooperative with the inextensible/non-contractible flexible plate to rotate the display module and the apparatus body module to a about 135° position.

Therefore, as shown in FIG. 5, when the operator opens the display module 91 to make the first shaft 10 clockwise rotate to a 135° position, the first, second, third and fourth rotors 11, 22, 33, cooperate with the inextensible/non-contractible flexible plates 50, 60 to transmit the force and make the second shaft 20 as well as the apparatus body module 92 synchronously counterclockwise rotate to a 135° position. That is, the display module 91 and the apparatus body module 92 are totally relatively rotated by 270°. FIG. 6 shows that when the operator opens and clockwise rotates the display module 91 to a 180° position, the apparatus body module 92 is synchronously counterclockwise rotated to a 180° position. That is, the display module 91 and the apparatus body module 92 are totally relatively rotated by 360°.

That is, by means of the synchronous movement device, a user can operate and rotate the display module 91 by a certain angle or range to achieve a travel double the rotational angle or range. Accordingly, the user can more quickly and conveniently operate the electronic apparatus.

In a preferred embodiment, the inextensible/non-contractible flexible plate 50 has such a length that after the first rotor 11 is 180° rotated along with the first shaft 10 (or the second rotor 22 is 180° rotated along with the second shaft 20), the first end 51 (or the second end 52) of the inextensible/non-contractible flexible plate 50 is still wound on the first rotor 11 (or the second rotor 22) by a length larger than ½ circumferential length of the main body b of the first rotor 11 (or the main body b of the second rotor 22).

It should be noted that the inextensible/non-contractible flexible plate 60 has such a length that after the third rotor 33 is 180° rotated along with the first shaft 10 (or the fourth rotor 44 is 180° rotated along with the second shaft 20), the first end 61 (or the second end 62) of the inextensible/non-contractible flexible plate 60 is still wound on the third rotor 33 (or the fourth rotor 44) by a length larger than ½ circumferential length of the main body b of the third rotor 33 (or the main body b of the fourth rotor 44).

It should be noted that the inextensible/non-contractible flexible plate 50 (or 60) is tightly wound on the first and second rotors 11, 22 (or the third and fourth rotors 33, 44) to transmit the force. During the force transmission process, the possibility of torque change is minimized so that the first and second shafts 10, 20 can be smoothly rotated. Moreover, once the rotational force disappears, the shafts stop rotating to be located in a desired position.

In comparison with the conventional device, the dual-shaft synchronous movement device of the present invention has the following advantages:

1. The rotary shafts (the first and second shafts 10, 20) and the relevant components (such as the first and second rotors 11, 22 and the inextensible/non-contractible flexible plate 50 wound thereon and the third and fourth rotors 33, 44 and the inextensible/non-contractible flexible plate 60 wound thereon) together form a synchronous movement mechanism. This structure is apparently different from the conventional device, which employs multiple gears for transmitting force.

2. The first and second rotors 11, 22 (or the third and fourth rotors 33, 44) and the cooperative inextensible/non-contractible flexible plate 50 (or 60) wound thereon together form a transmission structure of the synchronous movement mechanism. The synchronous movement mechanism is mounted between the display module 91 and the apparatus body module 92. When an operator 0°~180° rotates the display module 91, the apparatus body module 92 will synchronously relatively rotate by 0°~180°. Accordingly, the total rotational angle of the display module 91 and the apparatus body module 92 is 360°. That is, by means of the synchronous movement device, a user can operate and rotate the display module 91 by a certain angle or range to achieve a travel double the rotational angle or range. Accordingly, the user can more quickly and conveniently operate the electronic apparatus in more operation modes (or application ranges).

3. The first and second rotors 11, 22 (or the third and fourth rotors 33, 44) and the cooperative inextensible/non-contractible flexible plate 50 (or 60) wound thereon together form a transmission structure of the synchronous movement mechanism. Accordingly, the gap between the rotary shafts (the first and second shafts 10, 20) is as minified as possible. Therefore, the space occupied by the entire transmission unit or structure is reduced. Accordingly, when the transmission unit is applied to an electronic device, the electronic device can meet the requirement for lightweight and slimmed design.

4. The middle sections of the supports a of the first, second, third and fourth rotors 11, 22, 33, 44 have the extension sections d. After the first and second ends 51, 61, 52, 62 of the inextensible/non-contractible flexible plates 50, 60 are fixedly welded on the extension sections d of the supports a and extended out of the main bodies b through the slits e, the direction in which the inextensible/non-contractible flexible plates 50, 60 are wound on the main bodies b is not limited. This facilitates the assembling process.

5. Especially, the first and second rotors 11, 22 (or the third and fourth rotors 33, 44) contact the cooperative inextensible/non-contractible flexible plates 50, 60 by faces to transmit force. Accordingly, the torque is more uniformly distributed over the inextensible/non-contractible flexible plates 50, 60 to reduce the load per unit. In this case, the torque change and up and down deflection of the inextensible/non-contractible flexible plates 50, 60 are minimized and the first and second shafts 10, 20 can be smoothly rotated. Therefore, the synchronous movement device of the present invention overcomes the problem of delay of kinetic energy transmission of the conventional wires and the problem of the conventional transmission mechanism that the wires contact the rollers by points or lines so that the wires are likely to slip or deflect from the rollers and the wires will untruly operate to cause error. The synchronous movement device of the present invention also solves the problem of the conventional transmission mechanism that the fixing structure for assembling the wires with the rollers is not ideal so that in force transmission, the load on the wires or the pulling force applied to the wires will increase to deteriorate the transmission effect and the wires may detach from the rollers.

In conclusion, the dual-shaft synchronous movement device of the present invention is different from and advantageous over the conventional device.

The above embodiments are only used to illustrate the present invention, not intended to limit the scope thereof. Many modifications of the above embodiments can be made without departing from the spirit of the present invention.

What is claimed is:

1. A dual-shaft synchronous movement device comprising:
   a first rotor and a second rotor, each of the first and second rotors having a support and a main body enclosing the support, the support having a shaft hole; and
   an inextensible/non-contractible flexible plate disposed and connected between the first and second rotors, the inextensible/non-contractible flexible plate having a first end and a second end, the first end of the inextensible/non-contractible flexible plate being wound on the main body of the first rotor, the second end of the inextensible/non-contractible flexible plate being wound on the main body of the second rotor, whereby the first and second rotors are synchronously rotatable, a first shaft is fitted in the shaft hole of the first rotor and a second shaft is fitted in the shaft hole of the second rotor, when the first shaft drives the first rotor to rotate, the inextensible/non-contractible flexible plate pulls the second rotor to rotate in a direction reverse to a moving direction of the first rotor so as to make the first and second shafts synchronously rotate.

2. The dual-shaft synchronous movement device as claimed in claim 1, wherein each of the first and second shafts having a fixed end and a pivoted end.

3. The dual-shaft synchronous movement device as claimed in claim 2, wherein a third rotor is further disposed at the pivoted end of the first shaft and a fourth rotor is further disposed at the pivoted end of the second shaft, each of the third and fourth rotors having a support and a main body enclosing the support, the support having a shaft hole, an inextensible/non-contractible flexible plate being disposed and connected between the third and fourth rotors, the inextensible/non-contractible flexible plate having a first end and a second end, the first end of the inextensible/non-contractible flexible plate being wound on the main body of the third rotor, the second end of the inextensible/non-contractible flexible plate being wound on the main body of the fourth rotor.

4. The dual-shaft synchronous movement device as claimed in claim 3, wherein the first, second, third and fourth rotors and the inextensible/non-contractible flexible plates are assembled on the first and second shafts via a fixing assembly.

5. The dual-shaft synchronous movement device as claimed in claim 2, wherein the shaft holes of the first and second rotors have a configuration identical to a cross-sectional shape of the pivoted ends of the first and second shafts.

6. The dual-shaft synchronous movement device as claimed in claim 5, wherein the pivoted ends of the first and second shafts and the shaft holes of the first and second rotors have a rectangular cross section, whereby the first and second rotors are rotatable along with the first and second shafts.

7. The dual-shaft synchronous movement device as claimed in claim 3, wherein the shaft holes of the third and fourth rotors have a configuration identical to a cross-sectional shape of the pivoted ends of the first and second shafts.

8. The dual-shaft synchronous movement device as claimed in claim 7, wherein the pivoted ends of the first and second shafts and the shaft holes of the third and fourth rotors have a rectangular cross section, whereby the third and fourth rotors are rotatable along with the first and second shafts.

9. The dual-shaft synchronous movement device as claimed in claim 1, wherein the inextensible/non-contractible flexible plate connected between the first and second rotors is a flexible metal plate.

10. The dual-shaft synchronous movement device as claimed in claim 3, wherein the inextensible/non-contractible flexible plate connected between the third and fourth rotors is a flexible metal plate.

11. The dual-shaft synchronous movement device as claimed in claim 1, wherein an extension section extends from the support of each of the first and second rotors for fixing the first and second ends of the inextensible/non-contractible flexible plate, the inextensible/non-contractible flexible plate extending out of the main body of the first rotor through a slit formed on the main body of the first rotor to be radially wound around the outer surface of the main body of the first rotor, the inextensible/non-contractible flexible plate extending out of the main body of the second rotor through a slit formed on the main body of the second rotor to be radially wound around the outer surface of the main body of the second rotor.

12. The dual-shaft synchronous movement device as claimed in claim 11, wherein the first end of the inextensible/non-contractible flexible plate is fixedly welded on the extension section of the support of the first rotor the second end of the inextensible/non-contractible flexible plate being fixedly welded on the extension section of the support of the second rotor.

13. The dual-shaft synchronous movement device as claimed in claim 3, wherein an extension section extends from a middle section of the support of each of the third and fourth rotors for fixing the first and second ends of the inextensible/non-contractible flexible plate connected between the third and fourth rotors.

14. The dual-shaft synchronous movement device as claimed in claim 13, wherein the first end of the inextensible/non-contractible flexible plate connected between the third and fourth rotors is fixedly welded on the extension section of the support of the third rotor, the inextensible/non-contractible flexible plate extending out of the main body of the third rotor through a slit formed on the main body to be wound around the main body of the third rotor, the second end of the inextensible/non-contractible flexible plate connected between the third and fourth rotors being fixedly welded on the extension section of the support of the fourth rotor, the inextensible/non-contractible flexible plate extending out of the main body of the fourth rotor through a slit formed on the main body to be wound around the main body of the fourth rotor.

15. The dual-shaft synchronous movement device as claimed in claim 1, wherein the inner surfaces toward the main bodies of the inextensible/non-contractible flexible plate connected between the first and second rotors contact the outer surfaces of the main bodies of the first and second rotors wherein first and second ends of the inextensible/non-contractible flexible plate are inserted within respective slits formed in said main bodies.

16. The dual-shaft synchronous movement device as claimed in claim 3, wherein the inner surfaces toward the main bodies of the inextensible/non-contractible flexible plate connected between the first and second rotors contact the outer surfaces of the main bodies of the first and second rotors wherein first and second ends of the inextensible/non-contractible flexible plate are inserted within respective slits formed in said main bodies.

17. The dual-shaft synchronous movement device as claimed in claim 3, wherein the inextensible/non-contractible flexible plate is wound on the first and second rotors in a direction reverse to a direction in which the inextensible/non-contractible flexible plate is wound on the third and fourth rotors.

18. The dual-shaft synchronous movement device as claimed in claim 17, wherein the inextensible/non-contractible flexible plate connected between the first and second rotors is wound from a first side of the first rotor to an opposite second side of the second rotor and the inextensible/non-contractible flexible plate connected between the third and fourth rotors is wound from a third side of the third rotor to an opposite fourth side of the fourth rotor, said first side of said first rotor and said fourth side of said fourth rotor being initially coplanar, whereby the first and second shafts are rotated in different directions.

19. The dual-shaft synchronous movement device as claimed in claim 1, wherein the inextensible/non-contractible flexible plate has such a length that after the first rotor is 180° rotated, the first end of the inextensible/non-contractible flexible plate is still wound on the first rotor by a length larger than ½ circumferential length of the main body of the first rotor and after the second rotor is 180° rotated, the second end of the inextensible/non-contractible flexible plate is still wound on the second rotor by a length larger than ½ circumferential length of the main body of the second rotor.

20. The dual-shaft synchronous movement device as claimed in claim 3, wherein the inextensible/non-contractible flexible plate connected between the third and fourth rotors has such a length that after the third rotor is 180° rotated, the first end of the inextensible/non-contractible flexible plate is still wound on the third rotor by a length larger than ½ circumferential length of the main body of the third rotor and after the fourth rotor is 180° rotated, the second end of the inextensible/non-contractible flexible plate is still wound on the fourth rotor by a length larger than ½ circumferential length of the main body of the fourth rotor.

21. The dual-shaft synchronous movement device as claimed in claim 3, wherein the first and second shafts are assembled with each other and disposed in a casing.

22. The dual-shaft synchronous movement device as claimed in claim 3, wherein the fixed ends of the first and second shafts are adapted respectively to be fixed on a display module and an apparatus body module of an electronic apparatus by means of fixing seats.

23. The dual-shaft synchronous movement device as claimed in claim 2, wherein when the first shaft is 0°~180° rotated, the second shaft is synchronously 0°~180° rotated in a reverse direction.

24. The dual-shaft synchronous movement device as claimed in claim 22, wherein when the display module drives the first shaft to 0°~180° rotate, the second shaft and the apparatus body module are synchronously 0°~180° rotated in a reverse direction.

* * * * *